Patented May 3, 1938

2,116,019

UNITED STATES PATENT OFFICE 2,116,019

MOLDED INFUSIBLE SYNTHETIC RESINS AND PROCESS OF MAKING SAME

Alphonse Gams, Gustave Widmer, and Karl Frey, Basel, Switzerland, assignors, by mesne assignments, to the firm of Ciba Products Corporation, Dover, Del.

No Drawing. Application October 8, 1929, Serial No. 398,267. In Switzerland October 23, 1928

23 Claims. (Cl. 18—55)

This invention relates to infusible synthetic resins made from primary aromatic amines and aldehydes. It comprises the process for the manufacture of these resins, the new products themselves, as well as the application of the same in the synthetic resin industry.

According to the copending specification, Serial No. 245,039, filed January 6, 1928, molded infusible synthetic resins are obtained by subjecting an infusible but thermoplastic condensation product made by condensing one molecular proportion of a primary aromatic amine and an excess of a formaldehyde compound in presence of an acid and afterwards eliminating the action of the acid to molding under pressure, if necessary at raised temperature. The said process thus starts from an infusible but thermoplastic condensation product obtained with an excess of the formaldehyde compound in respect of the primary aromatic amine used.

It has been found, that a similar result is obtained by starting from a fusible condensation product made by condensing a primary aromatic amine with not more than an equimolecular proportion of formaldehyde in presence of a mineral acid and then eliminating the action of the acid. The amount of acid employed is preferably not substantially less than 0.25 equivalent of the amine employed.

Such fusible condensation products, when hardened with aldehydic compounds, yield infusible synthetic resins resembling those of specification Serial No. 245,039.

As aldehydic hardening agents aldehydes themselves, especially formaldehyde or agents yielding aldehyde under the conditions of the molding process, such as for instance paraformaldehyde or hexamethylene tetramine may be used. Instead of an aldehyde or an agent yielding aldehyde also potentially reactive aldehyde condensation products, i. e. such condensation products which may be hardened by heating, are serviceable, as for instance, phenol-aldehyde condensation products, condensation products of urea or thiourea with aldehydes, mixed condensation products from urea, thiourea and aldehyde. Also the condensation products of aromatic amines with aldehydes described in specification Serial No. 245,039, or the like, may be used. Mixtures of these hardening agents may also be used. The hardening operation may be applied to the resin alone or to a mixture thereof with a filling agent, a dyestuff, a softening agent or the like.

The resin may be applied to a fabric, paper or other surface and hardened in presence of an aldehyde or agent yielding aldehyde by heating, preferably under pressure.

The products thus obtained may, just as those resulting from the process of specification Serial No. 245,039, be applied for the most varied branches of the synthetic resin industry, such as for instance as insulating materials, for the manufacture of artificial objects of any kind, as materials for the construction of machine parts, especially such as have to withstand a high mechanical stress, such as gear wheels, parts of textile machines, such as bobbins, pickers, etc., further as jointing materials, as wood substitutes in the furniture or building industry, etc.

The following examples illustrate the invention, the parts being by weight:—

Example 1

93 parts of aniline (1 mol.) are dissolved in 100 parts of hydrochloric acid of 36 per cent. strength (1 mol.) in 200 parts of water. At a temperature of 25° C. there are added 75 parts of a formaldehyde solution of 40 per cent. strength (1. mol.). The temperature of the solution rises to 35-40° C. and the color becomes a deep red. After about an hour the condensation product thus produced is precipitated in the form of a thick magma by means of a solution of 40 parts of sodium hydroxide in 100 parts of water. It is filtered, washed until free from electrolytes and dried.

The yellowish powder thus obtained becomes a mobile melt at 120° C. and this melt when cooled solidifies to form a brown resin, which is insoluble in the usual solvents.

When mixed with a few per cent. of paraformaldehyde, the product may be converted, with or without addition of a filling agent, a dyestuff, a softening agent or the like, by heating under pressure, into the synthetic resin described in the aforesaid specification.

Example 2

93 parts of aniline (1 mol.) are dissolved with 25 parts of hydrochloric acid of 36 per cent. strength (0.25 mol.) in 200 parts of water and 75 parts of a formaldehyde solution of 40 per cent. strength (1 mol.) are added. There is produced a deep red solution, somewhat more viscous than that obtained in Example 1.

The working up is similar to that described in Example 1. The resin obtained melts at 180-200° C. and is hardened as described in Example 1.

Example 3

A fusible resin is made as described in Example 1 by condensation of 1 molecular proportion of aniline with 1 molecular proportion of formaldehyde in presence of 1 molecular proportion of hydrochloric acid and subsequent precipitation with caustic soda solution.

1 part of this resin is mixed with 1 part of a rapidly hardening phenol-formaldehyde condensation product and 2 parts of wood meal. This mixture has, when pressed at 150° C. a very good fluidity and yields molded pieces of great homogeneity and strength.

Example 4

A resin of low fluidity is made by condensation of 93 parts of aniline with 100 parts of concentrated hydrochloric acid and 112 parts of a solution of formaldehyde of 37.5 per cent. strength. The resin is then precipitated with aid of caustic soda solution, thoroughly washed, comminuted, dried, and finally mixed with 140 parts of wood meal. 70 parts of this molding powder are mixed with 30 parts of a fusible resin obtained as described in Example 1, paragraph 1.

The mixture, when pressed at 150° C., has a very good fluidity and yields very homogeneous pressed pieces.

The expression "formaldehyde compounds" is employed herein because it has been found that instead of formaldehyde itself also its polymers or any other substance splitting off formaldehyde under the conditions of the condensation may be used.

The expression "potentially reactive aldehyde condensation products", as used herein, is intended to refer to condensation products of formaldehyde and resin-forming substances, such as phenols and acid amides, which, with no further additions, are converted into insoluble, infusible resins, merely by heating.

What we claim is:—

1. The process of forming a resinous product of the aniline-formaldehyde type which comprises adding to a fusible non-heat-convertible aniline-formaldehyde condensation product which is formed in hydrochloric acid solution, sufficient of an aldehyde to convert the condensation product to the infusible state, and then heating the mass to convert it to an infusible product.

2. The process of forming a resinous product of the aniline-formaldehyde type which comprises adding to a fusible non-heat-convertible aniline-formaldehyde condensation product which is formed in hydrochloric acid solution, sufficient of an aldehyde-producing body to convert the condensation product to the infusible state, and then heating the mass to convert it to an infusible product.

3. The process of forming a resinous product of the aniline-formaldehyde type which comprises reacting aniline in aqueous hydrochloric acid medium with only enough formaldehyde to form a fusible product non-heat-convertible to the infusible state, separating said product from solution, adding sufficient formaldehyde to said product to convert it to the infusible state, and finally heating the mass to convert it to the infusible state.

4. The process of forming a resinous product of the aniline-formaldehyde type which comprises preparing in hydrochloric acid solution a fusible aniline-formaldehyde condensation product which is non-heat-convertible to the infusible state, separating the condensation product from solution and combining therewith under heat and pressure sufficient resin containing a high aldehydic content to convert the mass to the infusible state.

5. The infusible product obtained by the combination under heat and pressure of the fusible, non-heat-convertible condensation product obtained in hydrochloric acid solution from aniline and an aldehyde, and sufficient of an aldehyde-containing body to convert the condensation product to the infusible state.

6. The infusible product obtained by the combination under heat and pressure of the fusible, non-heat-convertible condensation product in hydrochloric acid solution of aniline and formaldehyde and sufficient of an aldehyde-containing body to convert the condensation product to the infusible state.

7. The process of manufacturing resinous products which comprises reacting aniline and formaldehyde in presence of hydrochloric acid in aqueous solution, the proportions of aniline and formaldehyde being such as to form only a fusible product which, per se, is incapable of being converted by heat to the infusible state, precipitating the said fusible product from the aqueous solution by means of alkali, separating the precipitated product from solution, washing and drying the precipitated product, adding such quantity of an aldehyde to the dried product as to enable it to be converted to the infusible state, and effecting such conversion to the infusible state by molding under heat and pressure.

8. The process of manufacturing resinous products which comprises reacting aniline, in the presence of an inorganic non-oxidizing mineral acid in aqueous solution, with such quantity of an aldehyde as to form only a fusible product, separating the latter from solution, adding such quantity of an aldehyde to the separated product as to enable it to be converted to the infusible state, and effecting such conversion to the infusible state by molding under heat and pressure.

9. The process of manufacturing resinous products which comprises reacting substantially 1 mol. of aniline with substantially 1 mol. of formaldehyde in presence of hydrochloric acid in aqueous solution until a condensation product forms, precipitating said condensation product from solution by means of substantially 1 mol. of alkali, separating the precipitated product, adding such quantity of an aldehyde to the separated product as to enable it to be converted to the infusible state, and molding under heat and pressure.

10. The infusible product obtained by the combination under heat and pressure of the fusible non-hardening condensation product obtained from aniline and formaldehyde in the presence of a substantial proportion of hydrochloric acid in solution by precipitation of such fusible product from said solution, and an aldehydic compound adapted to convert said fusible product into infusible state.

11. The infusible product obtained by the combination under heat and pressure of the fusible non-hardening condensation product obtained from aniline and a formaldehyde compound in the presence of a substantial proportion of hydrochloric acid in solution by precipitation of such fusible product from said solution, and an aldehydic compound adapted to convert said fusible product into infusible state.

12. The infusible product obtained by the combination under heat and pressure of the fusible non-hardening condensation product obtained from aniline and not more than an equimolecular proportion of a formaldehyde compound in the presence of a substantial proportion of hydrochloric acid in solution by precipitation of such fusible product from said solution, and a potentially reactive aldehyde condensation product adapted to convert said fusible product into infusible state.

13. The infusible product obtained by the combination under heat and pressure of the fusible non-hardening condensation product obtained from aniline and not more than an equimolecular proportion of formaldehyde in the presence of a substantial proportion of hydrochloric acid in solution by precipitation of such fusible product from said solution, and a potentially reactive aldehyde condensation product adapted to convert said fusible product into infusible state.

14. The infusible product obtained by the combination under heat and pressure of the fusible, non-heat-convertible condensation product obtained in presence of a substantial proportion of hydrochloric acid in solution from aniline and formaldehyde, and sufficient of a formaldehyde compound to convert the fusible product to the infusible state.

15. The infusible product obtained by the combination under heat and pressure of the fusible, non-heat-convertible condensation product obtained in presence of a substantial proportion of hydrochloric acid in solution from aniline and a formaldehyde compound, and sufficient of a formaldehyde compound to convert the fusible product to the infusible state.

16. The process of manufacturing a resinous infusible product of the aniline-formaldehyde type which comprises reacting aniline with not more than an equimolecular proportion of formaldehyde in a solution containing a substantial proportion of hydrochloric acid, whereby a fusible non-hardening product is formed, precipitating said fusible product from the solution, adding such quantity of an aldehydic compound to said precipitated fusible product as to enable the latter to be converted into the infusible state, and effecting such conversion to the infusible state by molding the mass at elevated temperature.

17. The process of manufacturing a resinous infusible product of the aniline-formaldehyde type which comprises reacting aniline with not more than an equimolecular proportion of a formaldehyde compound in a solution containing a substantial proportion of hydrochloric acid, whereby a fusible non-hardening product is formed, precipitating said fusible product from the solution, adding such quantity of an aldehydic compound to said precipitated fusible product as to enable it to be converted into the infusible state, and effecting such conversion to the infusible state by molding the mass at elevated temperature.

18. The process of manufacturing a resinous infusible product of the aniline-formaldehyde type which comprises reacting aniline with not more than an equimolecular proportion of formaldehyde in a solution containing a substantial proportion of hydrochloric acid, whereby a fusible non-hardening product is formed, precipitating said fusible product from the solution, adding such quantity of formaldehyde to said precipitated fusible product as to enable it to be converted into the infusible state, and effecting such conversion to the infusible state by molding the mass at elevated temperature.

19. The process of manufacturing a resinous infusible product of the aniline-formaldehyde type which comprises reacting aniline with not more than an equimolecular proportion of a formaldehyde compound in a solution containing a substantial proportion of hydrochloric acid, whereby a fusible non-hardening product is formed, precipitating said fusible product from the solution, adding such quantity of formaldehyde to said precipitated fusible product as to enable it to be converted into the infusible state, and effecting such conversion to the infusible state by molding the mass at elevated temperature.

20. The process of manufacturing a resinous infusible product of the aniline-formaldehyde type which comprises reacting aniline with not more than an equimolecular proportion of formaldehyde in a solution containing a substantial proportion of hydrochloric acid, whereby a fusible non-hardening product is formed, precipitating said fusible product from the solution, adding such quantity of a formaldehyde compound to said precipitated fusible product as to enable it to be converted into the infusible state, and effecting such conversion to the infusible state by molding the mass at elevated temperature.

21. The process of manufacturing a resinous infusible product of the aniline-formaldehyde type which comprises reacting aniline with not more than an equimolecular proportion of a formaldehyde compound in a solution containing a substantial proportion of hydrochloric acid, whereby a fusible non-hardening product is formed, precipitating said fusible product from the solution, adding such quantity of a formaldehyde compound to said precipitated fusible product as to enable it to be converted into the infusible state, and effecting such conversion to the infusible state by molding the mass at elevated temperature.

22. The process of manufacturing a resinous infusible product of the aniline-formaldehyde type which comprises reacting aniline with not more than an equimolecular proportion of formaldehyde in a solution containing a substantial proportion of hydrochloric acid, whereby a fusible non-hardening product is formed, precipitating said fusible product from the solution, adding such quantity of a potentially reactive aldehyde condensation product to said precipitated fusible product as to enable it to be converted into the infusible state, and effecting such conversion to the infusible state by molding the mass at elevated temperature.

23. The process of manufacturing a resinous infusible product of the aniline-formaldehyde type which comprises reacting aniline with not more than an equimolecular proportion of a formaldehyde compound in a solution containing a substantial proportion of hydrochloric acid, whereby a fusible non-hardening product is formed, precipitating said fusible product from the solution, adding such quantity of a potentially reactive aldehyde condensation product to said precipitated fusible product as to enable it to be converted into the infusible state, and effecting such conversion to the infusible state by molding the mass at elevated temperature.

ALPHONSE GAMS.
KARL FREY.
GUSTAVE WIDMER.